United States Patent
Dunne et al.

(10) Patent No.: US 9,611,013 B2
(45) Date of Patent: Apr. 4, 2017

(54) METHOD OF TRANSPORTING A HYDROELECTRIC TURBINE SYSTEM

(71) Applicant: OPENHYDRO IP LIMITED, Dublin (IE)

(72) Inventors: Paul Dunne, Dublin (IE); James Ives, Dublin (IE)

(73) Assignee: Openhydro IP Limited (IE)

( * ) Notice: Subject to any disclaimer, the term of this patent is extended or adjusted under 35 U.S.C. 154(b) by 0 days.

(21) Appl. No.: 14/364,006

(22) PCT Filed: Dec. 19, 2012

(86) PCT No.: PCT/EP2012/076103
§ 371 (c)(1),
(2) Date: Jun. 9, 2014

(87) PCT Pub. No.: WO2013/092676
PCT Pub. Date: Jun. 27, 2013

(65) Prior Publication Data
US 2014/0352592 A1 Dec. 4, 2014

(30) Foreign Application Priority Data
Dec. 21, 2011 (EP) .................................... 11195019

(51) Int. Cl.
*B63B 35/44* (2006.01)
*B63B 25/00* (2006.01)
(Continued)

(52) U.S. Cl.
CPC .......... *B63B 25/002* (2013.01); *B63B 35/003* (2013.01); *F03B 13/26* (2013.01);
(Continued)

(58) Field of Classification Search
CPC ........................... B63B 35/003; B63B 25/002
(Continued)

(56) References Cited

U.S. PATENT DOCUMENTS 4,556,004 A * 12/1985 Lamy ...................... B63B 9/065
  114/258
5,829,919 A * 11/1998 Heerema ............... B63B 35/003
  405/204
(Continued)

FOREIGN PATENT DOCUMENTS

DE    10 2008 046359 A1    3/2010
EP        1 980 670 A1    10/2008
(Continued)

OTHER PUBLICATIONS

International Search Report for corres. PCT/EP2012/076103, completed Mar. 6, 2013 by Tom Vermeulen of the EPO.

*Primary Examiner* — Stephen Avila
(74) *Attorney, Agent, or Firm* — Tarolli, Sundheim, Covell & Tummino LLP

(57) ABSTRACT

The present invention is concerned with a method of transporting a hydroelectric turbine system, and a vessel suitable for use in implementing said method, whereby the vessel comprises a raised or raisable section, which enables the vessel to pass over a portion of a base of the hydroelectric turbine system, when located in a flooded dry dock, which portion of the base projects above the water line in the dock.

10 Claims, 2 Drawing Sheets

(51) Int. Cl.
  *F03B 13/26* (2006.01)
  *B63B 35/00* (2006.01)
(52) U.S. Cl.
  CPC .... *F03B 13/264* (2013.01); *B63B 2035/4466* (2013.01); *Y02E 10/28* (2013.01)
(58) Field of Classification Search
  USPC .......................... 114/72, 264; 405/209, 205
  See application file for complete search history.

(56) References Cited

U.S. PATENT DOCUMENTS

2011/0139056 A1\* 6/2011 Cholley et al. ............... 114/264
2012/0183359 A1\* 7/2012 Nordstrom et al. .......... 405/205

FOREIGN PATENT DOCUMENTS

EP  1 980 746 A1  10/2008
WO  WO 01/34977 A1  5/2001

\* cited by examiner

METHOD OF TRANSPORTING A HYDROELECTRIC TURBINE SYSTEM

RELATED APPLICATIONS

The present invention is a U.S. National Stage under 35 USC 371 patent application, claiming priority to Serial No. PCT/EP2012/076103, filed on 19 Dec. 2012; which claims priority from EP 11195019.2, filed 21 Dec. 2011, the entirety of both which is incorporated herein by reference.

FIELD OF THE INVENTION

The present invention is concerned with a method of transporting a hydroelectric turbine system, and a vessel suitable for use in implementing said method.

BACKGROUND OF THE INVENTION

The use of renewable forms of energy is currently enjoying unprecedented activity due to various globally accepted environmental concerns. However in order to make a significant impact on global energy consumption, the scale of deployment of renewable energy projects will require enormous increases.

While the more well established forms of renewable energy, namely the harnessing of wind and solar energy, have reached a commercial level of deployment, the more recent exploration of tidal energy is a relatively new field of endeavour. As with any new technologies, it is necessary to move through proof of concept, through small scale and then full scale prototype testing before commercial levels of deployment can be achieved. In addition the cost and complexity of these new technologies must be reduced in order to render the technology commercially viable. The extraction of energy from tidal flows is a particularly problematic area, as the technology is deployed at sea, adding a further layer of complexity to the deployment process. Significant levels of heavy engineering are therefore required in order to achieve the desired results. It is therefore desirable to reduce the cost and complexity of this phase of the deployment process.

It is therefore an object of the present invention to address the above mentioned problem.

SUMMARY OF THE INVENTION

According to a first aspect of the present invention there is provided a method of transporting a hydroelectric turbine system comprising the steps of: locating a base of the system in a body of water such that at least a part of the base projects above the water; advancing a vessel into a position above the base such that the vessel at least partially surrounds the part of the base projecting above the water; and securing the base to the vessel for transport.

Preferably, the system comprises the base and a hydroelectric turbine connectable to the base, the method comprising the step of: securing the turbine to the base prior to advancing the vessel into a position above the base.

Preferably, the system comprises the base and a hydroelectric turbine connectable to the base, the method comprising the step of: securing the turbine to the base once the base has been secured to the vessel.

Preferably, the method comprises, in the step of securing the base to the vessel, raising the base against the vessel and securing the base to the vessel.

Preferably, the method comprises the step of; providing a structural portion of the vessel which is raised or raisable above the upwardly projecting part of the base or turbine.

Preferably, the method comprises the steps of: raising the structural portion from a first position, in which it forms an obstruction to the advancement of the vessel into position above the base, to a second position permitting the vessel to be advanced into position above the vessel; advancing the vessel into position above the vessel; and lowering the structural portion from the second position to the first position.

Preferably, the method comprises the steps of: locating the base in a dry dock; flooding the dry dock such that the base is partially submerged before advancing the vessel into position above the base.

Preferably, the method comprises the steps of: transporting the system to a deployment site; releasing the base from beneath the vessel; and allowing the turbine to pass downwardly through the portal.

According to a second aspect of the present invention there is provided a hydroelectric turbine system transport vessel comprising a body which defines a portal therein; and at least a portion of the body being raised or raisable above the waterline in order to permit the passage of a portion of a base or turbine of the turbine system beneath the body to be located within the portal.

Preferably, the body comprises a pair of hulls spaced apart from, and connected to, one another such as to define the portal therebetween, and at least one cross member extending between the hulls and defining the raised or raisable portion of the body.

Preferably, the at least one cross member is secured to one of the hulls via an articulated mounting which permits the cross member to be displaced between a first position, in which it extends across the portal and connects to the opposed hull, and a second raised position permitting access to the portal from the exterior of the vessel.

Preferably, the vessel is adapted to allow the base to be released and lowered away from, and/or raised under and connected to, the vessel.

Preferably, the base comprises a support which projects, when the base is connected beneath the vessel, upwardly through the portal.

Preferably, the portal is dimensioned to permit the support mounted turbine to pass downwardly therethrough.

DETAILED DESCRIPTION OF THE DRAWINGS

Figure 1:
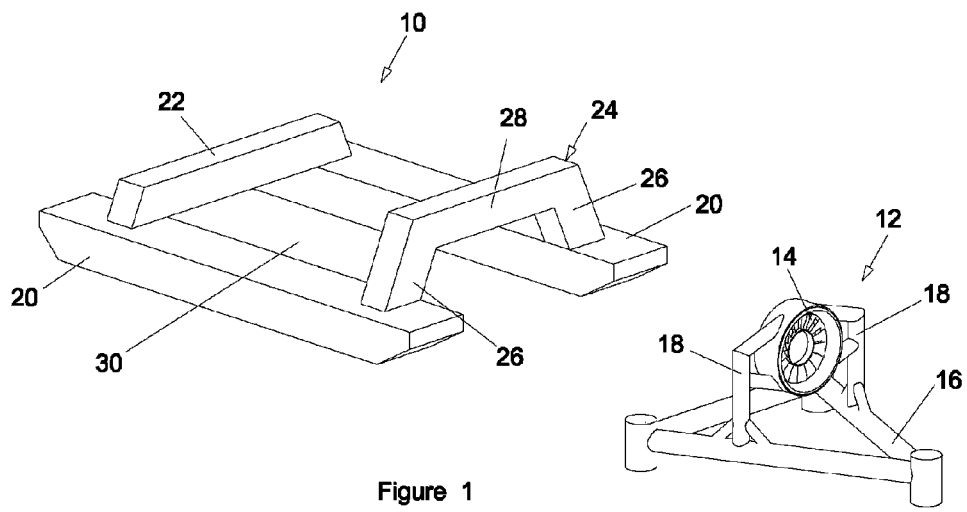
FIG. 1 illustrates a perspective view of an embodiment of a transport vessel for use with a method according to the present invention.
Figure 2:
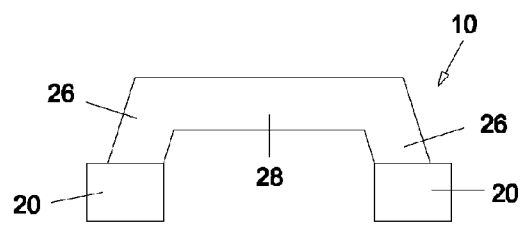
FIG. 2 illustrates a front elevation of the transport vessel shown in FIG. 1.

Referring now in particular to FIGS. 1 and 2 of the accompanying drawings there is illustrated a transport vessel, generally indicated as 10, for implementing a method of transporting a hydroelectric turbine system 12 according to the present invention. The transport vessel 10 is designed, as will be described in detail hereinafter, to reduce the complexity of, and provide a corresponding increase in the speed of, retrieval of the turbine system 12 from a dock D, for example a flooded dry dock or the like, for transport to a deployment site. As it will generally be necessary, in order to be commercially viable, to deploy farms of the turbine systems 12, it is desirable that the time and complexity taken to transport the turbine systems 12 from such a dock D to a deployment site B reduced.

The turbine system 12 comprises a hydroelectric turbine 14, which is mounted on a sub sea base 16, as is known in the art. The turbine 14 is preferably secured to the base 16 via a pair of substantially vertically projecting posts 18 extending upwardly from the base 16. The turbine 14 is then secured between the posts 18 in use.

In order to allow the turbine system 12 to be carried to a deployment site by the transport vessel 10, it is first necessary to secure the base 16 to the underside of the vessel 10, following which the turbine 14 can then be mounted to the pair of posts 18. It is therefore necessary to locate the base 16 within the dock D, thereby allowing the transport vessel 10 to be floated into position above the base 16, wherein the base 16 can then be winched upwardly against the underside of the vessel 10 and secured thereto. Careful alignment is thus required between the base 16 and the transport vessel 10 before the connection between the two can be made. For commercial levels of production it is envisaged that a number of the bases 16 would be manufactured in the dry dock D, and once completed the dock D flooded in order to enable the vessel 10 to be brought into the dock D and floated over each base 16 for retrieval and transport out to sea to the required deployment site. The location of, and alignment with, each base 16, once the dock D has been flooded, is improved by flooding the dock D such that a water line L in the dock D is just below the pair of posts 18. In this way the posts 18 are visible and can then be used as a marker by which the vessel 10 can be more quickly aligned with the base 16. The posts 18 do however, by projecting above the water line L, pose a risk to the vessel 10 as it approaches.

Thus referring to FIGS. 1 and 2 the transport vessel 10 comprises a pair of spaced apart pontoons 20 which are connected to one another via a rear cross beam 22 and a front cross beam 24. While the rear cross beam 22 preferably extends straight between the pair of pontoons 20, the front cross beam 24 comprises a pair of uprights 26, one extending upwardly from each pontoon 20, and connected by a cross member 28. Thus this cross member 28 is in a raised position relative to both the rear cross beam 22, the water line L, and more particularly the raised posts 18. The vessel 10 can therefore be advanced along the dock D towards the base 16, with the front cross beam 24 leading, or positioned towards a front of the vessel 10 with respect to the direction of travel. As the vessel 10 approaches the base 16 and begins to pass over same, the raised cross member 28 will permit the pair of posts 18, which are projecting above the water line L, to pass beneath the cross member 28. Once the pair of posts 18 are located within a portal 30 defined between the pontoons 20 and the rear and front cross beams 22, 24, the vessel 10 is held at that position. The pair of posts 18, which are clearly visible above the water line L, significantly improve the process of aligning the vessel 10 above the base 16. At this point the base 16 can be connected via a number of lines (not shown) to winches (not shown) located on the vessel 10, and the base 16 winched upwardly into position directly beneath the vessel 10 and secured in place. The turbine 14 can then be mounted to the base 16 via the posts 18, at which point the vessel 10 can then be floated out of the dock D and transported to the required deployment site.

It is also envisaged that the turbine 14 may be secured to the base 12 prior to the vessel 10 being advanced into position above the base 12. Where such a sequence is to be employed the vessel 10, and in particular the shape and dimension of the front cross beam 24, will have to be modified to allow the base 12 mounted turbine 14 to pass therebeneath.

Figure 3:
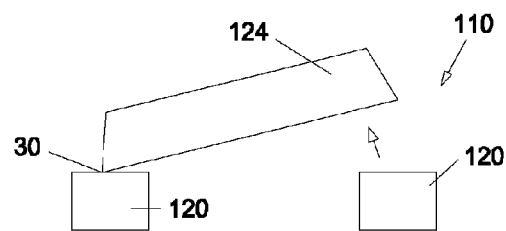
FIG. 3 illustrates an alternative embodiment of a transport vessel for use in performing the method according to the present invention.

Referring now to FIG. 3 there is illustrated an alternative embodiment of a transport vessel, generally indicated as 110, adapted to implement the method of transporting a hydroelectric turbine system 112 according to the present invention. In this alternative embodiment like components having accorded like reference numerals, and unless otherwise stated perform a like function.

The transport vessel 110 again comprises a pair of pontoons 120 connected by a rear crossbeam (not visible) and a front crossbeam 124. However unlike the previous embodiment, the front crossbeam 124 extends directly between the pontoons 120. However, a hinge 30 is provided between one end of the crossbeam 124 and the respective pontoon 120. This hinge 30 permits the front crossbeam 124 to be displaced between a first position in which the crossbeam 124 extends substantially horizontally between the pontoons 120, and a second or raised position as illustrated in FIG. 3. The transport vessel 110 is preferably provided with suitable mechanical/hydraulic apparatus (not shown) in order to effect displacement of the front crossbeam 124 between the raised and lowered positions. It will however be appreciated that this displacement could be effected by an external source such as a crane (not shown) or the like located at the dock D.

Thus the vessel 110 can be advanced towards the base 116, and on approach the front crossbeam 124 can be raised from the first position into the second or elevated position. In this position the vessel 110 can be advanced over the base 116, with the raised crossbeam 124 permitting the passage of the posts 118 into a portal 130 defined between the pontoons 120 and the crossbeam 124. At this point the front crossbeam 124 can be displaced back into the lowered position, and the end opposite the hinge 30 secured to the respective pontoon 120 in order to provide structural integrity to the vessel 110. As before the base 116 can then be raised and secured into position directly beneath the vessel 110, and a turbine 114 then secured thereto for transport to the desired deployment site.

As with the first embodiment of the invention, it is envisaged that prior to the vessel 110 being advanced above the base 116 the turbine 114 may be secured thereto.

Figure 4:
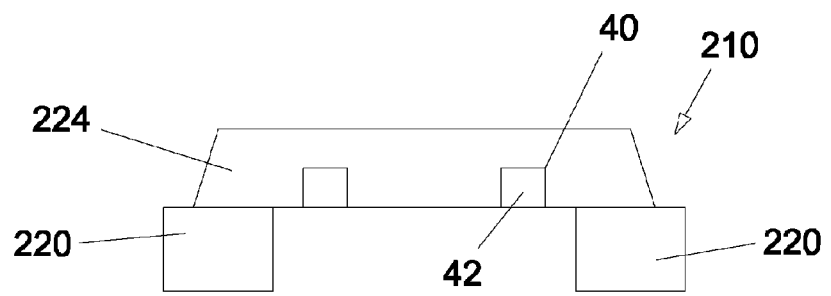
FIG. 4 illustrates a further alternative embodiment of a transport vessel for use in performing the method of the present invention.
Figure 5:
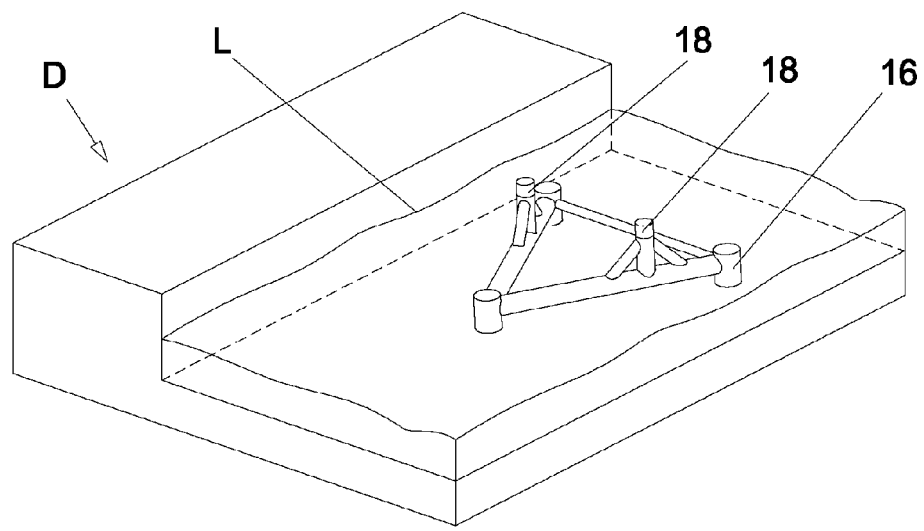
FIG. 5 illustrates a perspective view of a dock as an example of a location at which the method of the present invention may be performed.

Referring now to FIG. 4 there is illustrated a further alternative embodiment of a transport vessel, generally indicated as 210, for transporting a hydroelectric turbine system 212 to a deployment site. In this further embodiment like components have been accorded like reference numerals, and unless otherwise stated perform a like function.

The vessel 210 comprises a pair of pontoons 220 connected by a rear (not shown) and a front crossbeam 224. In order to permit the vessel 210 to pass over upwardly extending posts (not shown) of the base (not shown), a pair of suitably dimensioned and positioned channels 40 are cut or otherwise formed in the cross member 224. These channels 40 may or may not be closable by means of suitable inserts or panels 42. Thus as the vessel 210 is advanced towards the upright posts (not shown), the panels 42, if in position, are removed in order to expose the channels 40. The vessel 210 can then be advanced such that the posts pass through the channels 40 and into a portal (not shown) defined between the pontoons 220 and crossbeams. The panels 42 can then be replaced in order to increase the structure and integrity of the crossbeam 224.

As with the previous embodiments, the base (not shown) can then be winched into position directly beneath the vessel 210, and a hydroelectric turbine (not shown) secured thereto for transport to the deployment site. It will thus be appreciated that the method and vessel 10, 110, 210 of the present invention significantly reduces the time taken, and the complexity, in mounting the hydroelectric turbine system to the vessel 10, 110, 210 for transport to a deployment site. This is particularly beneficial when deploying a number of the turbine systems, for example as would be required when establishing a farm of hydroelectric turbines.

What is claimed is:

1. A method of transporting a hydroelectric turbine system comprising a base and a hydroelectric turbine connectable to the base, the method comprising the steps of:
   locating the base of the system in a body of water such that at least a part of the base projects above the water;
   securing the turbine to the base;
   advancing a vessel into a position above the base and the turbine such that the vessel at least partially surrounds the part of the base and/or the turbine projecting above the water;
   securing the base to the vessel for transport;
   transporting the system to a deployment site;
   releasing the base from beneath the vessel; and
   allowing the turbine to pass downwardly through the portal.

2. A method according to claim 1 in which the system comprises the base and a hydroelectric turbine connectable to the base, the method comprising the step of:
   securing the turbine to the base once the base has been secured to the vessel.

3. A method according to claim 1 comprising, in the step of securing the base to the vessel, raising the base against the vessel and securing the base to the vessel.

4. A method according claim 1 comprising the step of:
   providing a structural portion of the vessel which is raised or raisable above the upwardly projecting part of the base or turbine.

5. A method according to claim 4 comprising the step of:
   raising the structural portion from a first position, in which it forms an obstruction to the advancement of the vessel into position above the base, to a second position permitting the vessel to be advanced into position above the vessel;
   advancing the vessel into position above the vessel; and
   lowering the structural portion from the second position to the first position.

6. A method according to claim 1 comprising the steps of:
   locating the base in a dry dock;
   flooding the dry dock such that the base is partially submerged before advancing the vessel into position above the base.

7. A hydroelectric turbine system transport vessel comprising a body which defines a portal therein; and at least a portion of the body being raised or raisable above the waterline in order to permit the passage of a portion of a base or turbine of the turbine system beneath the body to be located within the portal, the body comprising a pair of hulls spaced apart from, and connected to, one another such as to define the portal therebetween, and at least one cross member extending between the hulls and defining the raised or raisable portion of the body, the at least one cross member being secured to one of the hulls via an articulated mounting which permits the cross member to be displaced between a first position, in which it extends across the portal and connects to the opposed hull, and a second raised position permitting access to the portal from the exterior of the vessel.

8. A transport vessel according to claim 7 in which the vessel is adapted to allow the base to be released and lowered away from, and/or raised under and connected to, the vessel.

9. A transport vessel according to claim 7 in which the base comprises a support which projects, when the base is connected beneath the vessel, upwardly through the portal.

10. A transport vessel according to claim 7 in which the portal is dimensioned to permit the support mounted turbine to pass downwardly therethrough.

* * * * *